No. 643,017. Patented Feb. 6, 1900.
J. E. TUCKER.
TIRE INFLATING MECHANISM.
(Application filed Apr. 8, 1899.)
(No Model.)
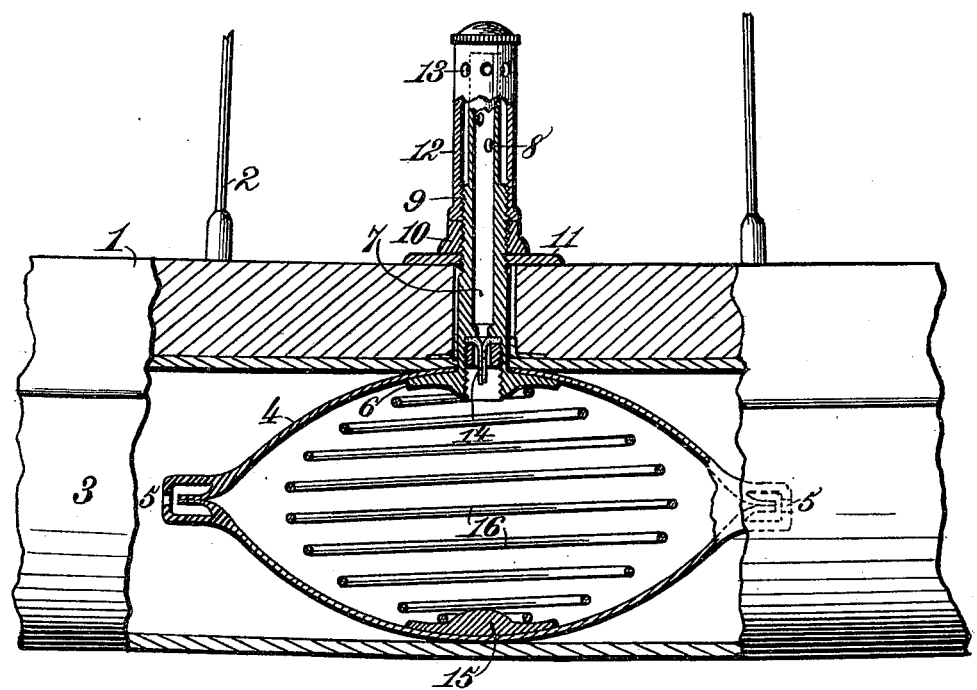
Witnesses.
Robert Everett
Inventor.
Junius E. Tucker.
By
James L. Norris
Atty.

UNITED STATES PATENT OFFICE.

JUNIUS E. TUCKER, OF MEMPHIS, TENNESSEE, ASSIGNOR OF ONE-HALF TO GEORGE W. PERSON, OF SAME PLACE.

TIRE-INFLATING MECHANISM.

SPECIFICATION forming part of Letters Patent No. 643,017, dated February 6, 1900.

Application filed April 8, 1899. Serial No. 712,297. (No model.)

*To all whom it may concern:*

Be it known that I, JUNIUS E. TUCKER, a citizen of the United States, residing at Memphis, in the county of Shelby and State of Tennessee, have invented new and useful Improvements in Tire-Inflating Mechanism, of which the following is a specification.

My invention relates to tire-inflating mechanism, the object of the same being to provide means whereby the ordinary pneumatic tire used upon bicycles and other like vehicles may be automatically inflated and retained in inflated condition.

The invention has particular reference to that class of inflating devices in which a flexible bulb located on the inside of the tire is compressed by the weight of the rider upon the wheel and acts by the expansion of the same when the weight is removed to draw in air from the outside and discharge it into the interior of the tire. Serious objections have arisen to this class of devices in the past owing to the fact that the flexible bulb will become compressed by the pressure of the air within the tire outside said bulb and by reason of the fact that there is danger of puncturing the flexible bulb itself and of drawing in dust and dirt through the filling-nipple thereof.

My invention consists in providing on the inside of the flexible bulb a coil-spring which tends to hold said bulb in its expanded condition and acts to resist the external pressure on the bulb from the air within the tire until the tire has been inflated to such a degree that its pressure is equal to or greater than that of the spring.

It also consists in providing on opposite sides of the bulb protectors or guards against which the opposite ends of the spring bear, the said guards serving to prevent the puncture of the bulb from without and the wear and consequent puncture of the same from the engagement of the spring within.

It also consists in providing improved mechanism whereby dust and dirt are prevented from being introduced into the tire from without by the automatic action of the bulb and its spring.

In the drawing forming part of the specification the figure thereof represents a central longitudinal sectional view of a portion of a wheel having a pneumatic tire thereon provided with my improved inflating mechanism.

The rim or felly 1 of the wheel, the spokes 2, and the pneumatic tire 3 may all be of any suitable form and construction. On the inside of the tire at one or more points, as may be desired, is located a flexible bulb 4, constructed of rubber or other suitable material, preferably elliptical in shape, with discharge-openings 5 5 at opposite ends thereof, provided with check-valves to prevent the passage of the air from the tire to the interior of the bulb. The said bulb is secured to the felly 1 by means of a dish-shaped plate 6, located on the inside of said bulb and provided with a tubular stem or nipple 7, which extends through an opening in the rim 1 toward the hub of the wheel. The said nipple is provided with lateral openings 8 at points intermediate its ends and with external screw-threads 9 adjacent to the inner surface of the rim or felly 1. The same is locked in place against the felly by means of a nut 10, which engages the screw-threads 9 and bears against a washer or wear-plate 11 surrounding said nipple and lying in contact with said felly. A cap 12 fits upon the nipple 7, engages the screw-threads 9 thereon, and locks the nut 10 in place. The said cap also serves as a dust-guard and is provided with lateral openings 13 adjacent to the head thereof, through which and the annular space between the nipple 7 and said cap and through the openings 8 the air is admitted to the interior of the bulb 4. A suitable valve 14 is provided in the nipple 7, adjacent to the dish-shaped plate 6, for controlling the entrance of the air. It will of course be understood that an opening is provided in the plate 6, which communicates with the nipple 7. On the inside of the bulb 4, opposite the plate 6, is a similar dish-shaped guard or plate 15, against which the ends of a coil-spring 16, located on the inside of the bulb 4, bear, the plate or guard 15 serving to prevent the puncture of the bulb 4 by external means, and both plates 6 and 15 serving to prevent the abrasion and wear of the bulb 4 by the engagement of the coil-spring 16 therewith.

The operation of the device is as follows:

When it is desired to inflate the tire 3, pressure is applied from above, which will serve to compress the bulb 4 and the spring 16 therein. This pressure may be exerted either by forcing downwardly on the wheel by hand or by the weight of the rider thereon. When it takes place, however, the air within the bulb 4 is forced out through the discharge-openings 5 5 into the tire. After the pressure is removed the bulb 4, through the action of the spring 16, is forced outwardly, which action closes the valves in the openings 5 and draws in air from without through the openings 13 in cap 12, the annular space between said cap and the nipple 7, the openings 8 in said nipple, and the valve 14, filling the bulb 4. When the bulb is again compressed, the action first above set forth will be repeated until the tire 3 has been inflated to the proper degree. It will be observed that by providing a spring 16 of suitable tension on the inside of the bulb 4 the external pressure upon the bulb from the air within the tire will be resisted by said spring until the tire 3 has been inflated to such a degree that the pressure therein is equal to or exceeds the tension of the spring. This, however, will not take place until the tire has been inflated to the proper degree. When it does happen, however, the bulb 4 will collapse, the outer surface thereof will be removed from the inner surface of the tire, and the air within the tire will have free passage around the bulb, no action of said bulb being effected by compression of the tire in riding. When the tire becomes deflated somewhat, however, and the pressure of air therein falls below the pressure exerted by the spring 16, the bulb 4 will be thrown out into its normal position with its outer surface in contact with the inner surface of the tire, and said bulb will be again caused to operate by the alternate compression and expansion of the bulb 4, due to the weight of the rider exerted upon different parts of the tire during the act of riding. This will serve to restore the wasted air to the inside of the tire, with the result that the tire will be automatically maintained at an equal degree of inflation at all times. It will also be observed that it is impossible for the bulb to become punctured from outside sources or to become worn by the action of the spring on its inner surface or for air mixed with dust or dirt to enter the interior of the bulb on account of the relative arrangement of the inlet-openings 13 and 8 in the cap 12 and nipple 7, respectively, through which the air must pass.

Having now described the invention, what I claim as new, and desire to secure by Letters Patent, is—

The combination with a pneumatic tire, of a flexible bulb located on the inside thereof, valved inlet and discharge openings for said bulb, a coil-spring on the inside of said bulb, for the purpose described, and plates secured to the inner surface of said bulb on opposite sides thereof, both of said plates being engaged by said spring and serving to protect the bulb from abrasion from said spring, one of said plates serving to protect said bulb against puncture from without, and the other of said plates having a nipple thereon with a valved opening therein through which air is admitted to said bulb and also serving as a clamp for securing the bulb to the wheel-rim.

In testimony whereof I have hereunto set my hand in presence of two subscribing witnesses.

JUNIUS E. TUCKER.

Witnesses:
T. B. GWARTNEY,
U. S. ROGERSON.